United States Patent [19]  [11] 3,745,701
Marvin  [45] July 17, 1973

[54] LAWN BLOCK SYSTEM
[76] Inventor: John R. Marvin, 7615 New Battle Grove Rd., Baltimore, Md. 21222
[22] Filed: Dec. 1, 1971
[21] Appl. No.: 203,596

[52] U.S. Cl. ............................ 47/33, 94/31, 256/19, 52/102
[51] Int. Cl. ............................................. A01g 1/08
[58] Field of Search ...................... 47/32–33; 94/31; 52/102; 256/19

[56] References Cited
UNITED STATES PATENTS
2,235,356   3/1941   Byers ................................. 52/102 X
606,151   6/1898   Johnson .................................. 47/33
2,826,393   3/1958   Miller .................................... 256/19
1,916,494   7/1933   Schrickel ............................... 47/33

OTHER PUBLICATIONS
Walks, Walls, Patio Floors, Sunset Book, Menlo Park, Calif., 1963, page 32 relied on.

Primary Examiner—Robert E. Bagwill
Attorney—John F. McClellan, Sr.

[57] ABSTRACT

A lawn defining system of co-acting slabs having upper surfaces specially angled to provide safe, efficient paths for rotary mowers, and having special stepped overlapping joints between slabs gapped beneath the overlap to allow relative motion and to prevent capillary action from drawing ground water into the joints; embodiments are provided for fence underlayment and for installation around building foundations.

6 Claims, 8 Drawing Figures

PATENTED JUL 17 1973 3,745,701
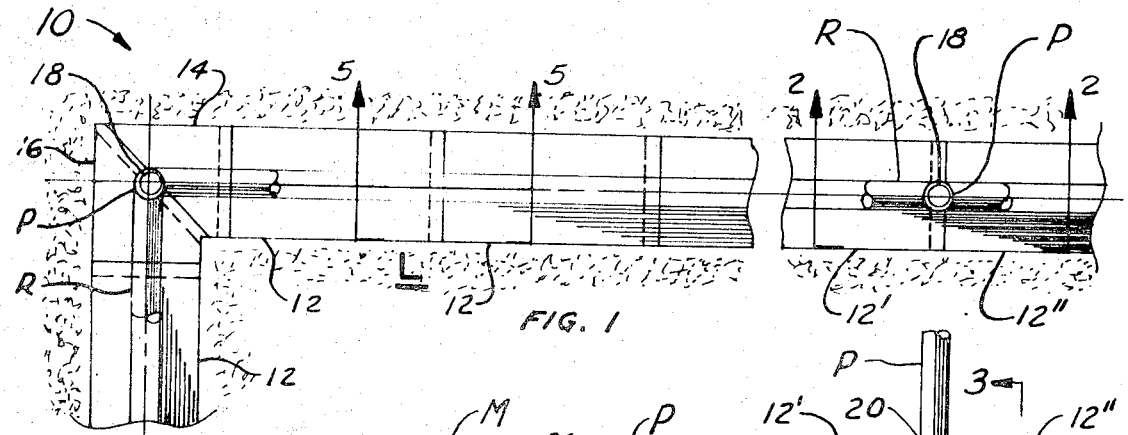
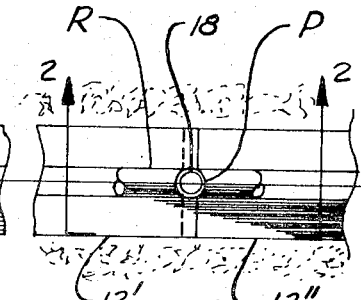
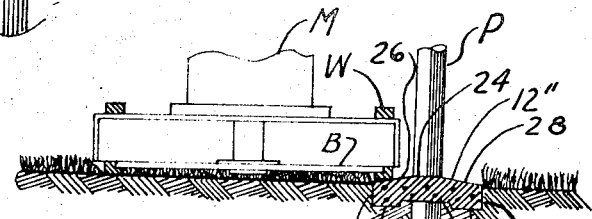
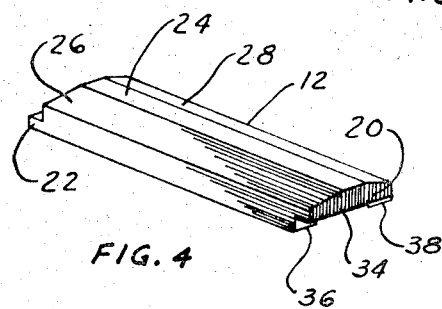
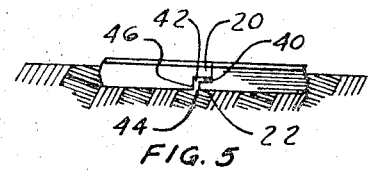
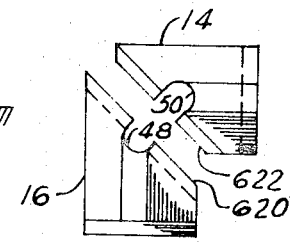
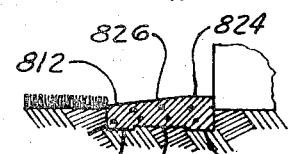
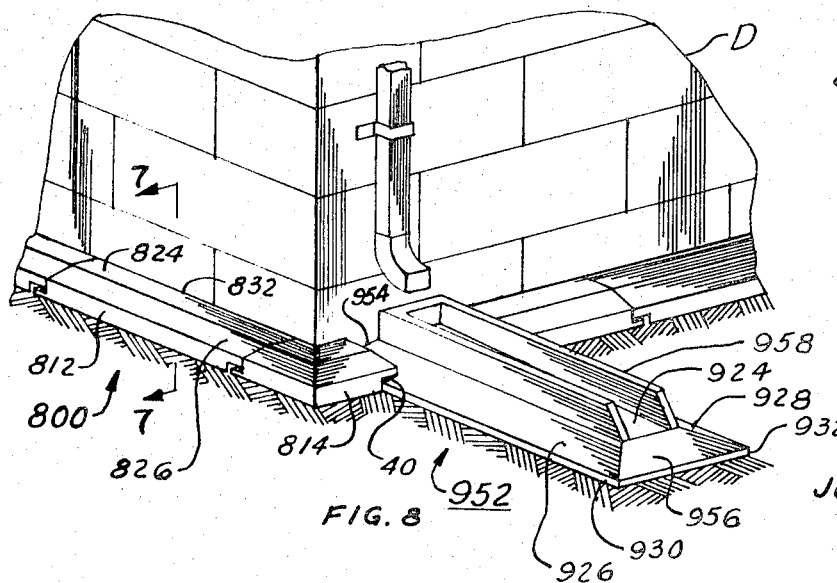
JOHN R. MARVIN
INVENTOR.
BY John F. McClelland
ATT'Y.

LAWN BLOCK SYSTEM

This invention relates generally to edging and bordering systems and specifically to overlapping slab systems for ground installation.

In the prior art various designs of overlapping slabs have been disclosed for uses such as bordering cemetery lots, lawns, and structures such as walls and buildings.

When properly made, installed, and maintained, such borders produce very beautiful effects, enhancing property margins, fence lines, foundations, paths and the like. However, in spite of the desirability of such slab systems, they are seldom seen anywhere except on institutional and governmental property. Costs of procurement and installation and difficulty of maintenance and lawn cutting have prevented widespread use of such systems around private dwellings and lawns.

Until the present time no system available for the purpose has found widespread acceptance and become the standard article of commerce for the purpose.

One of the difficulties with prior-art systems is that water tends to accumulate underneath the slabs and in the joints and on freezing, to dislocate and even break the slabs.

Another difficulty of some prior art systems is that they fail to regulate the growth of grass and weeds so as to produce a sharp, clean margin on mowing. They cause this difficulty either by preventing mowing alongside or, in the case of flat portions of slabs, by allowing low-lying grass to grow over the flat portions; such creeping growth is unsightly and difficult to remove except by hand.

A further problem has become very important with increasing use of the vertical spindle rotary mower. The numbers of injuries caused by the blades of such mowers when striking objects during mowing are making people more careful about what they install in and around lawns. The old-art devices which are low enough to permit mowing along the margins do not provide adequate warning means and means to prevent injury when overrun by rotary mowers. They can also damage reel-type mowers when overrun.

Objects of the present invention, therefore, are to provide a lawn block system;

which is itself attractive in appearance and which allows close, regular, easy grass clipping to define lawns sharply and attractively;

which has safety features for preventing injury to people and equipment when overrun during mowing, including a warning step, a safety margin beyond the warning step, special non-siphoning joints, a non-rocking base, and a non-trip, non-skid top surface;

which is easy to install, requiring minimum preparation and effort;

which is adaptable for a wide variety of uses;

which requires little or no upkeep, and which is economical, durable, and reliable.

The invention is characterized in general by overlapping slabs having special cross-sectional shapes and accommodative, non-siphoning joints.

The above and other advantages and objects of the invention will become more readily apparent on examination of the following description, including the drawings, in which:

FIG. 1 is a plan view of a lawn block system along a fence line;

FIG. 2 is a side elevation taken at 2—2, FIG. 1;

FIG. 3 is a section taken at 3—3, FIG. 2, showing also a detail of a lawnmower in use with the system;

FIG. 4 is a perspective view of a straight element of the system of FIG. 1;

FIG. 5 is a joint detail in side elevation;

FIG. 6 is a plan view of corner elements of the system of FIG. 1;

FIG. 7 is an end section taken at 7—7, FIG. 8, of a second embodiment of the invention;

FIG. 8 is a perspective view of a system installed around a building foundation.

In the Figures, which will now be taken up in detail, similar reference numerals indicate similar parts.

FIG. 1 shows the Lawn Blocks System 10 of this invention in plan view installed on a lawn L under a fence having posts P and rails R, portions of which are shown. The blocks are preferably of concrete or similar durable material. The system includes straight blocks 12, which overlap in series to make a straight run, and corner blocks 14, 16 which overlap each other and the adjoining straight block to change direction of the run. For the use shown, the corner blocks are provided with structure defining a hole 18 for the cornerpost. A similar arrangengement defines holes in the straight blocks to accommodate line posts, at 18 between straight blocks 12', 12''.

FIG. 2 shows the elevation detail at 2—2, FIG. 1. Each block has an overhang flange 20 at one end flush with the top and a lower flange 22 at the other end flush with the bottom to form the overlap joints in series assembly with other blocks.

FIG. 3 shows the cross-sectional view adjacent the post in FIG. 2. Each of the blocks, including both straight and corner blocks, with and without holes, has the same shape in section. The blocks have a flat, horizontal surface 24 extending across the central portion of the top. The width of the horizontal portion of the top comprises a substantial fraction of the width of the block. The width of the block is made such as to accommodate fence posts in the width of the horizontal surface, leaving the majority of the width of the block in sloping surfaces on either side.

The horizontal surface breaks downward on either side into the symmetrical flat surfaces 26, 28 which slope at a safety angle of a few degrees with respect to the top surface and which extends to the sides of the block. The sides 30, 32 of the block are vertical and are low relative to the width of the block. The bottom of the block is plane and horizontal with a central recess 34 leaving a footing 36, 38 at either side about half the width of the horizontal top surface.

These proportions provide several inventive advantages. The low profile of the block combined with the spaced footing feature permits the block to be slipped into place beneath fence structure with little or no preparation, and yet to be stable underfoot when pressed into the ground. Fluctuations in ground temperature affect all blocks equally, freezing and thawing of ground has little or no effect under the center. The height of the block is such as to allow the wheel W of a mower M to roll freely onto the adjacent sloping surface 26 without fouling the mower blade B, with the blade set to cut at the lowest position ordinarily provided for lawn mowing.

Grass growing at the side of the block is thus easily and quickly mowed by running the mower along the length of the block and other blocks in series with it.

The relatively abrupt break in gradient at the junction between the sloping surface 26 and the top surface 24 gives the operator a warning when the wheel runs over the junction, so that the mower will not be pushed astraddle the block, possibly fouling the blade B. The horizontal surface 24 at the top is just wide enough to provide a safety margin on which the wheel can travel before passing over into the straddling position, giving the operator time needed for correction, particularly with a self-propelled mower. The horizontal top surface is preferably wide enough to contain the diameter of the posthole, but the greater width is sloped to provide a width path for mower wheels.

FIG. 4 shows in perspective the proportions and the relations of the top and side surfaces, discussed in relation to FIG. 3, of a typical block 12. The shape is strong, yet the block is relatively light for the size, so that it is easily handled in lengths which are several times the dimension of the width, which may be 8 inches in a preferred model.

FIG. 5 illustrates the detail of the overlapping step joint which is characteristic of this invention. In the joints, the dimension of the overhang flange 20 measured in the direction of the length of the block is greater than the corresponding dimension of the lower flange 22. The sum of the thicknesses of the overhang flange and the lower flange is less than the thickness of the block. These differences in dimension produce the not-quite-complementary structure of the joint overlap. In the vertical dimension this leaves a horizontal gap 42 between the bottom of the overhang 22 and the top of the lower flange. In the horizontal dimension this leaves a connecting vertical gap 44 between the end of the lower flange and the end 46 of the recess in the next block.

The upper portion of the two blocks butt together, forming flush, continuous top surfaces, aligned by the joint structure.

On installation only the lower gap 44 is below ground level. Grass conceals the upper gap 42. The upper gap provides room for a generous quantity of sealer to join the blocks and prevent vegetation from penetrating up into the butt joint, where root and stem diameters would be sufficient to wedge the joint apart, in contrast with the wide gaps 42 and 44 which prevent such wedging.

The width of the lower gap also prevents capillary action from siphoning ground water up between the walls of the joint where it could force the blocks apart or crack them on freezing. The footing structure 36, 38 described in reference to FIG. 3 retards underflow of water from rain and melting snow, and tends to keep the bottom of the block assembly dry. Drainage from between the abutting ends of the top is shunted to either side by the sealer 40.

FIG. 6 shows the overlap details of the corner blocks 14 and 16, including diagonal overlap structure 620, 622 and additionally shows the respective slots 48, 50 which comprise a circular post hole when the corner bocks are assembled together.

FIG. 7 and FIG. 8 describe a second embodiment 800 of the invention. In this embodiment the blocks are largely similar in section and in proportion to the blocks of the first embodiment, except that the top surfaces are different. The tops of the straight blocks 812 are assymetrical. Most of the top is taken up by sloping flat surfaces 826, leaving a horizontal flat surface 824 at one side 832, which is designed to fit against a structure, such as the dwwlling D shown. A similar corner block 814 is provided. The joint structure throughout is the same as that described in reference to FIG. 4, except that the overhang flanges of the adjacent blocks contact the side-sloping top faces 926, 928 are somewhat wider and slope to thinner edges 930, 932 than the blocks; one end 954 is made vertical to abut the structure protected by the splash block, and the opposite end 956 and top 924 slope away from the abutting end 954. The top is provided with an integral upright trough 958 for channeling flow toward the downslope end. Many of the same advantages described in reference to the first embodiment will also be apparent in the provision for mowing to produce a clean margin without danger of fouling the blade.

Obviously, many modifications and variations of the present invention are possible in light of the above teachings. It is therefore, to be understood that within the scope of the appended claims the invention may be practiced otherwise than as specifically described.

What is claimed and desired to be secured by United States Letters Patent is:

1. A lawn block system comprising: plural overlapping means in horizontal serial relation including first and second lawn blocks with step overlaps, each of said lawn blocks having, as viewed in transverse section, a bottom with a central recess along the length thereof, leaving longitudinal footings along the bottom margins, a top with a horizontal portion and a portion downwardly sloped from the horizontal portion; said horizontal portion extending a substantial fraction of the width of the lawn blocks and the downwardly sloped portion extending a greater fraction of said width than the horizontal portion; the first lawn block step joint structure comprising a full width longitudinal flush extension of the top having a vertical surface on the end, the second lawn block step joint structure comprising a vertical surface positioned to form a butt joint with the end of the extension of the first lawn block and a full width longitudinal extension of the bottom protrusive beyond said positioned vertical surface, the underneath surface of the first lawn block extension and the upper surface of the second lawn block extension proportioned to space apart vertically on assembly of said system, thereby leaving drainage space including space for sealing-material at the bottom of said butt joint.

2. A lawn block system as recited in claim 1, wherein the extension of the first lawn block is longer than the extension of the second lawn block, thereby on assembly leaving a horizontal spacing between the end of the second lawn block extension and the first lawn block, said horizontal spacing being connective with said vertical spacing, thereby leaving a second drainage space connective with the first said drainage space.

3. A lawn block system as recited in claim 1, wherein all said lawn blocks are symmetrical in section about the centerline, said horizontal top portion being parallel longitudinally with the bottom and having a said downsloping portion contiguous with both sides of the top.

4. A lawn block system as recited in claim 3, wherein the step joint overlap structure between the first and second lawn blocks includes matching vertical slots in the respective blocks, thereby forming a hole for a post.

5. A lawn block system as recited in claim 3, wherein at least a pair of said blocks have matching said step-joint overlap structures located at a diagonal angle to the longitudinal center lines thereof for thereby forming a corner assembly, and have matching slots vertically through the diagonally located step joint structure, thereby forming a holde for a post.

6. A lawn block system as recited in claim 2, wherein the horizontal top portion of all said blocks is parallel longitudinally with the bottom, and wherein the horizontal top portion is located to one side of the block.

* * * * *